United States Patent [19]
Reed

[11] Patent Number: 5,626,927
[45] Date of Patent: May 6, 1997

[54] TRAVEL WINDOW BOX

[76] Inventor: Claude A. Reed, 4810 S. 136th St., Omaha, Nebr. 68137

[21] Appl. No.: 517,898

[22] Filed: Aug. 22, 1995

[51] Int. Cl.⁶ .................................................. A01G 9/02
[52] U.S. Cl. ................................ 428/23; 47/68; 428/34.1
[58] Field of Search .............................. 428/17, 21, 23, 428/24, 34.1; 47/40, 40.5, 68

[56] References Cited

U.S. PATENT DOCUMENTS

| | | | |
|---|---|---|---|
| 1,381,995 | 6/1921 | Humbert | 428/24 X |
| 2,095,564 | 10/1937 | Gleason | 428/21 |
| 3,696,960 | 10/1972 | Smirle | 428/23 X |
| 3,800,470 | 4/1974 | Kleine | 47/40 X |
| 4,418,496 | 12/1983 | Koistien | 428/23 X |
| 5,334,425 | 8/1994 | O'Brien et al. | 428/23 |
| 5,368,267 | 11/1994 | Howard | 47/40 X |

*Primary Examiner*—Henry F. Epstein
*Attorney, Agent, or Firm*—Zarley, McKee, Thomte Voorhees & Sease; Mark D. Frederiksen

[57] ABSTRACT

The portable box includes a housing forming four sides of an enclosure, with a front panel pivotally mounted to the enclosure and a support bar pivotally mounted in the upper end of the enclosure. The support bar includes an elongated strut and a clamping arm adjustably secured to the strut to selectively secure a display item in an upright position projecting upwardly from the support bar. The front panel is pivotally mounted on the enclosure to swing between an open position, wherein the support bar may pivot to store the display items within the enclosure, and a closed position securing the support bar in either an upright display position or an inverted storage position.

7 Claims, 4 Drawing Sheets

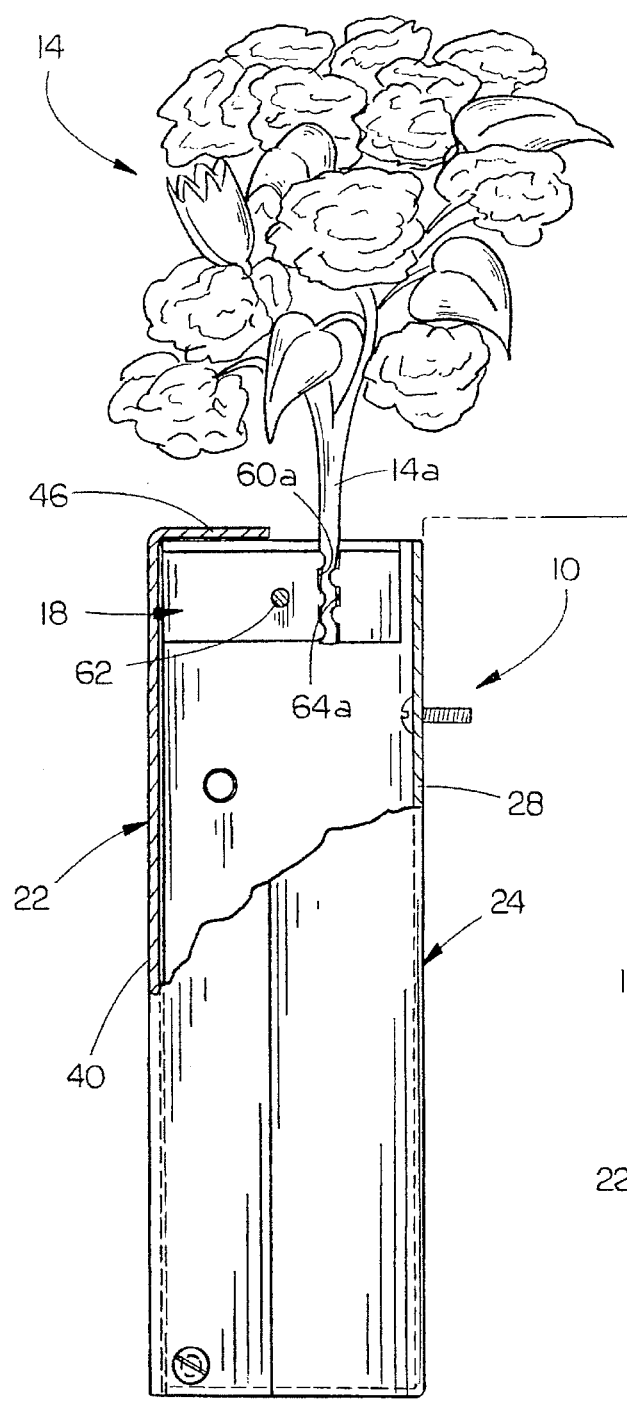
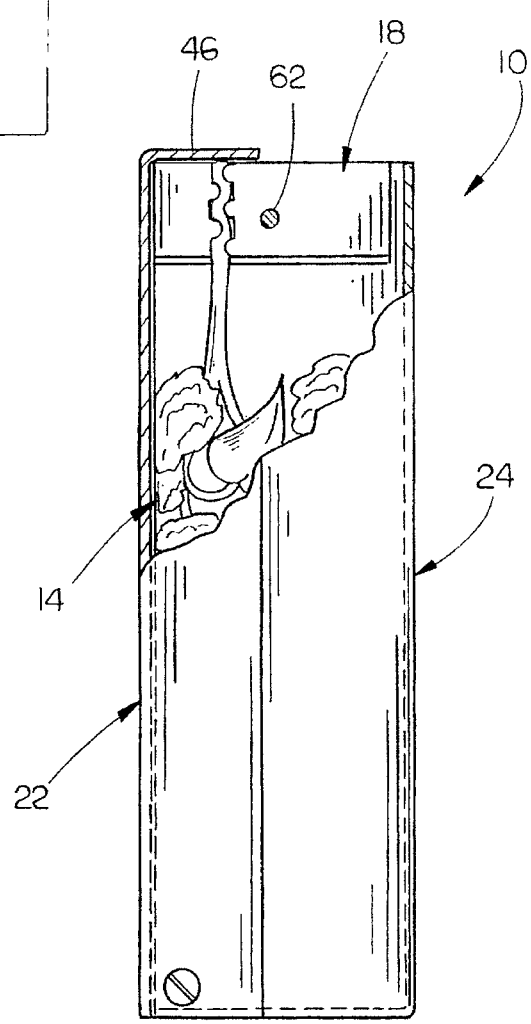
FIG. 4
FIG. 5

TRAVEL WINDOW BOX

TECHNICAL FIELD

The present invention relates generally to window boxes, and more particularly to quick, simple, safe and wind-protected self-storage or display of florals, plants or greenery by travel window boxes which are permanently or detachably connected to motor homes and recreational vehicles (RVs).

BACKGROUND OF THE INVENTION

Flower boxes to beautify the windows of homes have been enjoyed for many years throughout this country and the world. The advent of travel trailers and RVs has permitted the traveler to enjoy the comforts of home while on the road. However, the use of flower boxes on motor homes and RVs has, to date, been impractical. The only way a traveler could enjoy a window box for floral or greenery display was to mechanically install the flower box while the RV was stationary, and then removing the flower box before resuming travel-a lengthy procedure not practical for continuously moving travelers.

SUMMARY OF THE INVENTION

It is therefore a general object of the present invention to provide an improved travel window box.

Another object is to provide a window box permanently attached to a mobile vehicle which permits viewing from both inside and outside the RV and which does not have to be removed during travel.

Still another object is to provide a travel window box in which a single rotary motion instantly converts its flowers and greenery to the display position or reverse to provide safe, secure windproof, weatherproof storage.

Still another object is to compress the floral display during storage to reduce its size to within the maximum dimensions permitted for the legal installation of window boxes on motor homes and other RVs.

Still another object is to provide a travel window box which is simple and economical to manufacture and refined in appearance and appealing to purchasers of motor homes and RVs.

These and other objects will be apparent to those skilled in the art.

The portable box of the present invention includes a housing forming four sides of an enclosure, with a front panel pivotally mounted to the enclosure and a support bar pivotally mounted in the upper end of the enclosure. The support bar includes an elongated strut and a clamping arm adjustably secured to the strut to selectively secure a display item in an upright position projecting upwardly from the support bar. The front panel is pivotally mounted on the enclosure to swing between an open position, wherein the support bar may pivot to store the display items within the enclosure, and a closed position securing the support bar in either an upright display position or an inverted storage position.

BRIEF DESCRIPTION OF THE DRAWINGS

FIG. 4 is a vertical sectional view through the flower box of FIG. 2;

FIG. 5 is a sectional view similar to FIG. 4, but with the flower box oriented in the storage position;

DESCRIPTION OF THE PREFERRED EMBODIMENT

Figure 1:
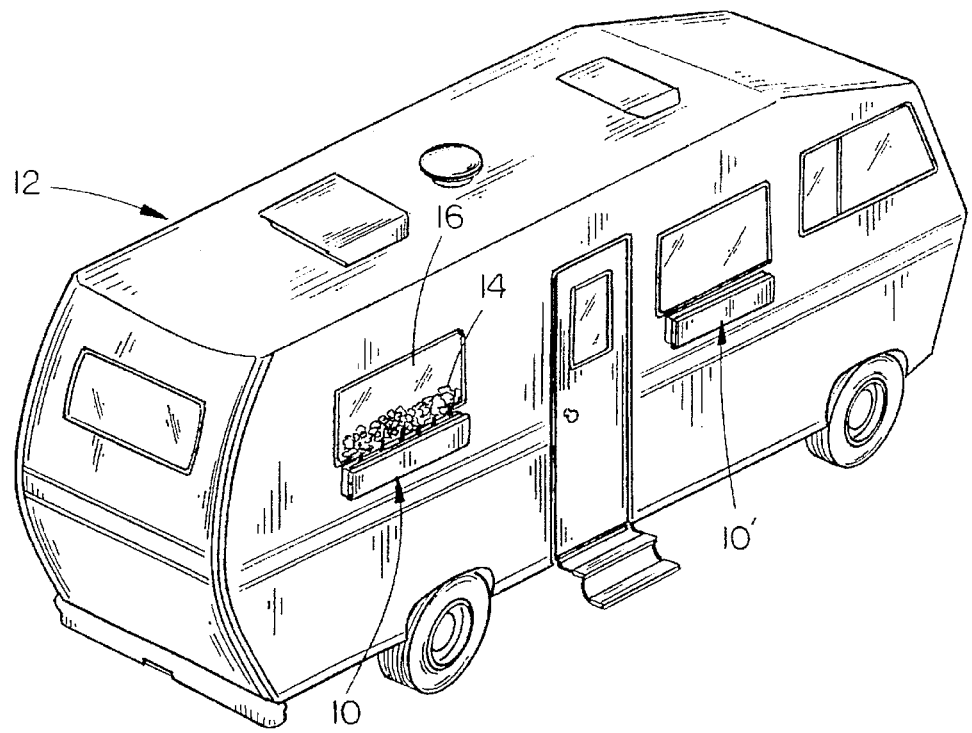
FIG. 1 is a perspective view of an RV with the flower box of the present invention installed thereon.

Referring now to the drawings, in which similar or corresponding parts are identified with the same reference numeral and more particularly to FIG. 1, the flower box of the present invention is designated generally at 10 and is shown installed on an RV 12. Flower box 10 is oriented in a display position, with a plurality of flowers and plants 14 projecting upwardly within view of a window 16 of the RV. Flower box 10' is oriented in the storage position, with the plants and flowers stored within the housing, for storage during movement of the RV.

Figure 2:
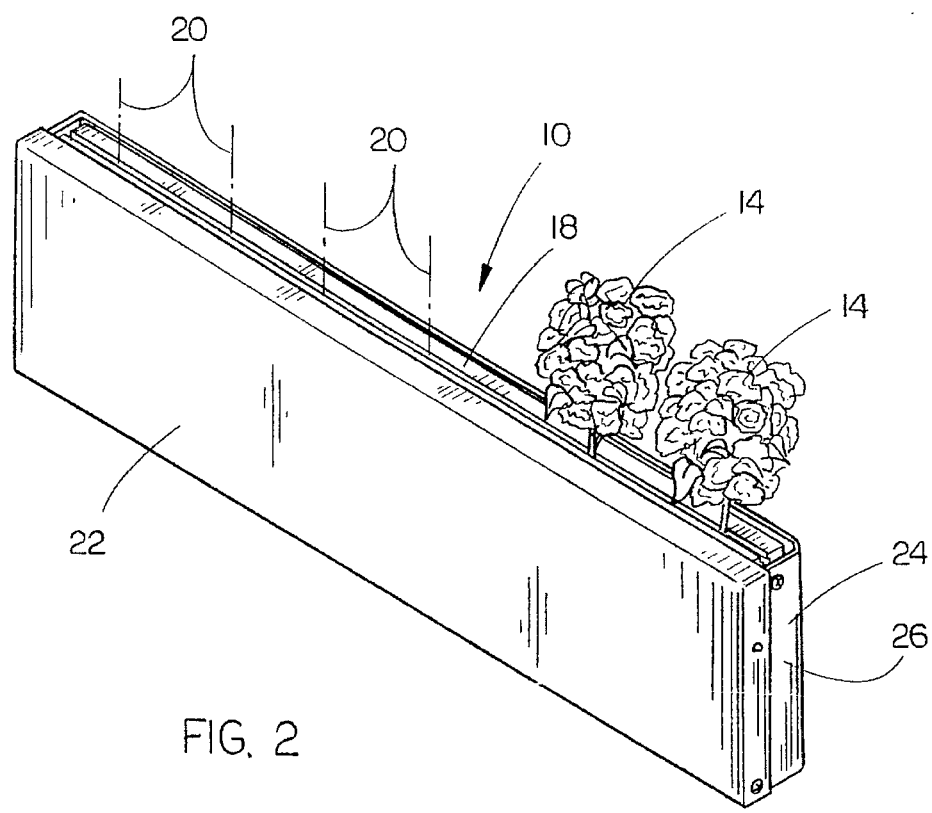
FIG. 2 is an enlarged perspective view of the flower box of the present invention oriented in the display position.

Referring now to FIG. 2, flower box 10 is shown with two flowering plants 14 projecting from a pivotable support bar 18. Center lines 20 indicate locations for additional plants 14. Cover 22 is pivotally mounted to a housing 24, and is selectively locked into position by lock mechanism 26.

Figure 3:
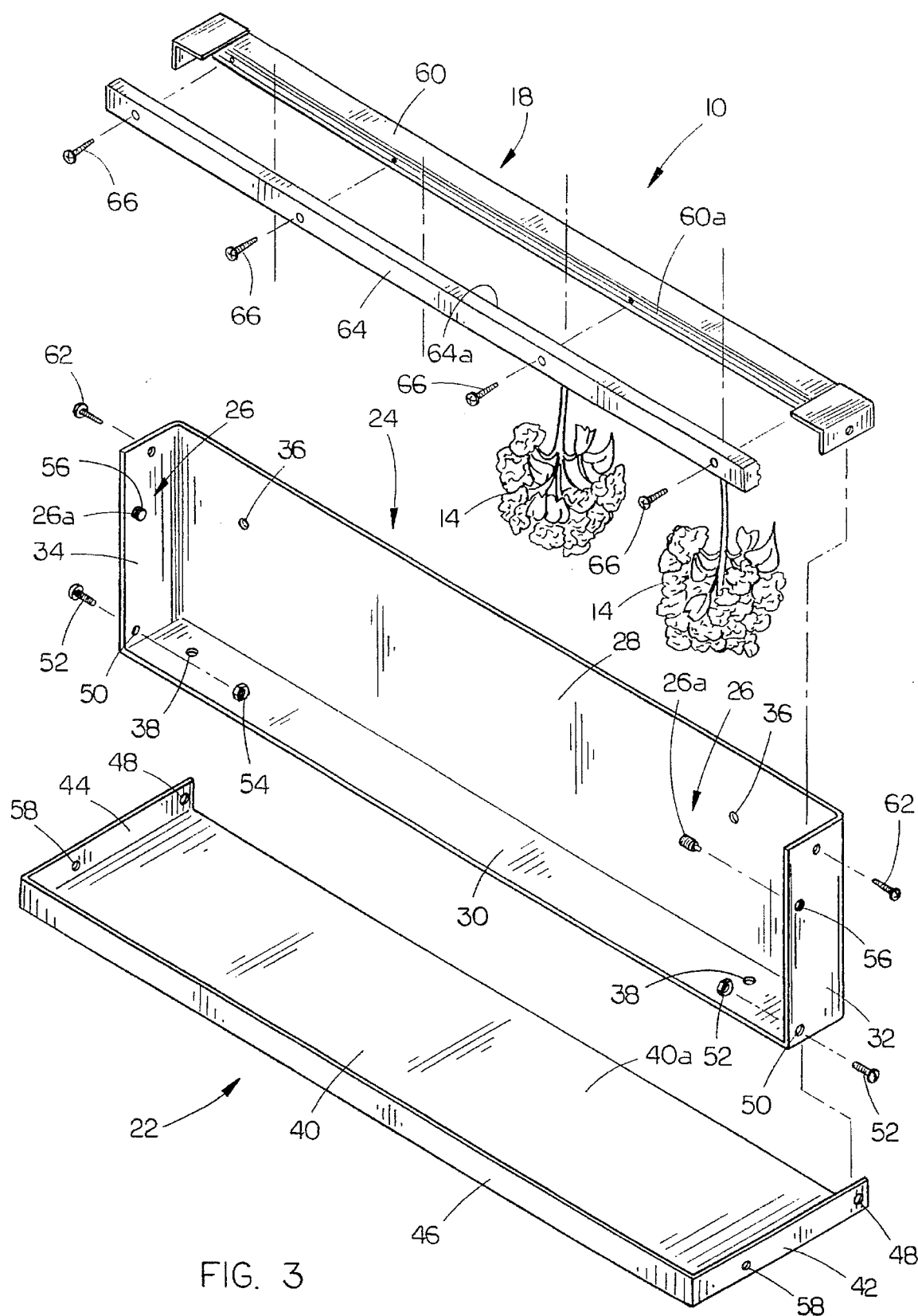
FIG. 3 is an exploded perspective view of the flower box oriented in the storage position.

Referring now to FIG. 3, housing 24 includes a vertically oriented back panel 28, a bottom panel 30 projecting forwardly from the lower edge of back panel 28, and a pair of generally rectangular end panels 32 and 34 projecting forwardly from the end edges of back panel 28 and connected to the end edges of bottom panel 30. A pair of apertures 36 formed in back panel 28 permit mounting of flower box 10 to the vertical side of an RV or the like by use of screws, bolts or other fasteners. A pair of drain holes 38 are provided in bottom panel 30 to drain water which may accumulate within housing 24.

Cover 22 includes a front panel 40 having a pair of opposing end flanges 42 and 44 projecting from a rearward surface 40a of front panel 40 at the opposing end edges thereof. A top flange 46 projects from the rearward surface 40a of front panel 40 along one longitudinal edge thereof, and connects end flanges 42 and 44. An aperture 48 formed in the lower end of each end flange 42 and 44 corresponds with apertures 50 formed in end panels 32 and 34 to receive a pivot bolt 52 therethrough, to pivotally connect cover 22 to housing 24. Nuts 54 fasten pivot bolts 52 in place to interconnect cover 22 in housing 24.

Figure 6:
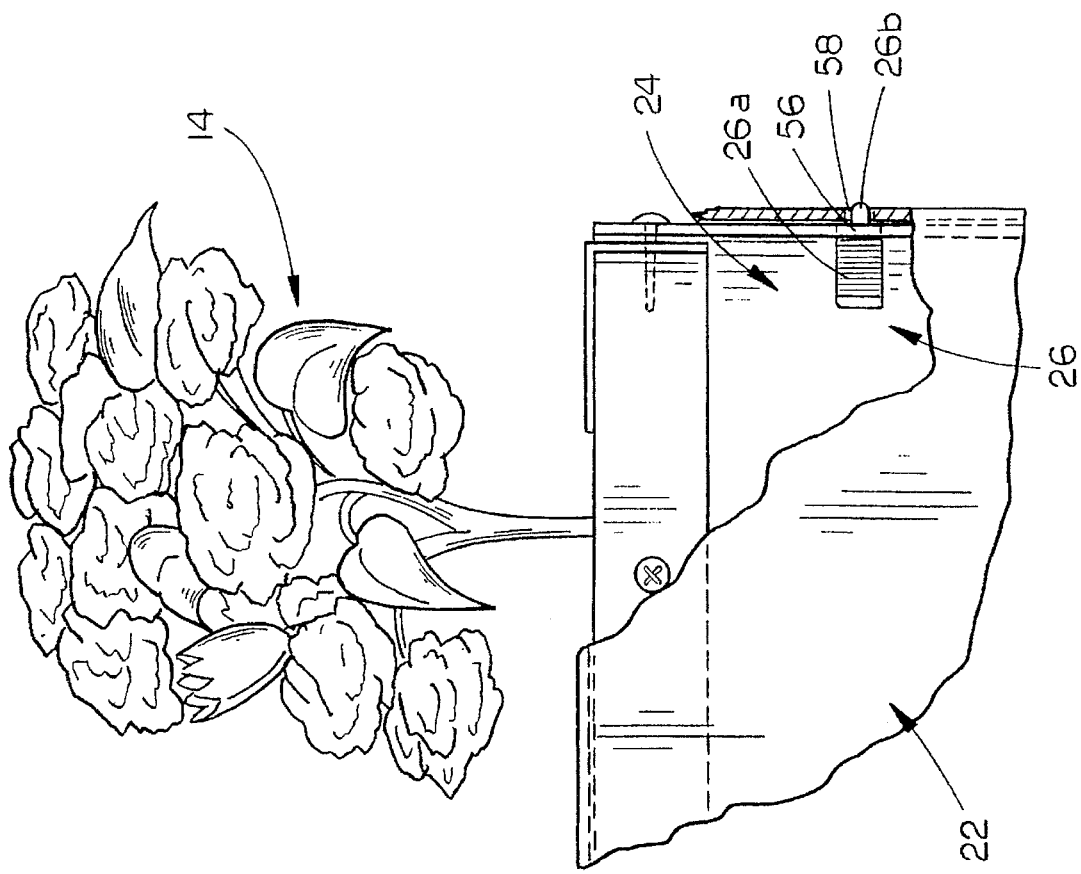
FIG. 6 is a partial front elevational view with a portion cut away to show the lock mechanism.

Lock mechanisms 26 include an exteriorly threaded base 26a which is threaded into a threaded aperture 56 in each end panel 32 and 34. A corresponding aperture 58 is formed in each end flange 42 and 44 of cover 22, and will align with apertures 56 when cover 22 is pivoted to a closed position generally parallel to back panel 28. As shown in FIG. 6, the lock mechanism base 26a has a forward end threaded into threaded aperture 56 on the interior of housing 24, with a spring-loaded pin 26b projecting outwardly through aperture 58 in cover 22, thereby "locking" cover 22 in a vertical position. Applying pressure to pin 26b will cause the pin to retract a sufficient amount to permit pivoting movement of cover 22 to "open" the flower box.

Referring once again to FIG. 3, support bar 18 includes an elongated strut 60 pivotally connected at opposing ends between end panels 32 and 34 by a pair of pivot pins 62. An elongated clamping arm 64 is adjustably connected along the length of strut 60 by a plurality of screws 66. Strut 60 includes a gripping face 60a with a plurality of parallel ridges and valleys extending along its length. A gripping face 64a on clamping arm 64 corresponds with strut gripping face 60a, and includes a plurality of longitudinal ridges aligned with the valleys on the strut gripping face, and a plurality of valleys aligned with the ridges on the strut gripping face. Artificial plants 14 or other display items may thereby be fastened between strut 60 and clamping arm 64 so as to pivot with strut 60.

Referring now to FIGS. 4 and 5, flower box 10 is shown in the display position and storage position, respectively. As shown in FIG. 4, cover 22 is pivoted to a position with front panel 40 parallel to back panel 28, and top flange 46 overhanging the upper surface of support bar 18. It can be seen that top flange 46 will prevent support bar 18 from pivoting out of the display position, with plants 14 projecting upwardly out of flower box 10. FIG. 4 also shows how the ridges and valleys of strut gripping face 60a coact with the valleys and ridges of clamping arm gripping face 64a to retain the stem 14a of the artificial plant 14 therebetween.

When the traveler is ready to move the RV, or otherwise desires to store plants 14, the lock mechanism pins 26b (as shown in FIG. 6) are pressed to permit cover 22 to be pivoted outwardly away from housing 24. Support bar 18 is then pivoted on pivot pins 62 from the upright orientation shown in FIG. 4, to the upside down orientation shown in FIG. 5. It can be seen that the storage position of support bar 18 will orient the plants 14 downwardly within housing 24. Cover 22 is then pivoted upwardly and locked into position, with top flange 46 again overlying support bar 18. Thus, plants 14 are protected within housing 24 during transport.

Figure 7:
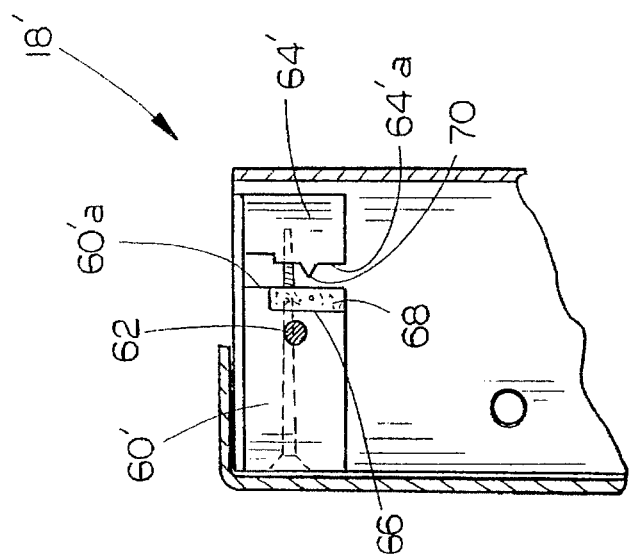
FIG. 7 is a second embodiment of the clamp mechanism of the flower pot.

Referring now to FIG. 7, a second embodiment of the support bar is designated generally at 18', and is pivotally mounted on pivot pins 62 in a fashion similar to support bar 18 of the first embodiment. Second embodiment 18'of the support bar utilizes a strut 60' with a modified gripping face 60'a in combination with a clamping arm 64 with a modified clamping face 64'a. As shown in FIG. 7, a notch 66 is formed in strut gripping face 60'a, and a strip 68 of resilient compressible material is affixed within the notch so as to extend the length of strut 60'. The clamping arm gripping face 64a includes a projecting ridge 70 extending along the length of the gripping face 64a and located generally centrally opposite strip 68, so as to engage a plant stem between the strip and the ridge.

Whereas the invention has been shown and described in connection with the preferred embodiments thereof, many modifications, substitutions and additions may be made which are within the intended broad scope of the appended claims. For example, items other than artificial plants may be displayed in the box. Various holidays have display items associated with them which may be removably mounted on the support bar, such as flags, Christmas garland, Easter cut-outs, or other items which personalize the RV.

I claim:

1. A portable box for artificial plants, comprising:
    a housing having a generally vertical back panel, a generally horizontal bottom panel affixed along a lower edge of the back panel, and a pair of opposing end panels connecting the back and bottom panels, said back, bottom and end panels forming four sides of an enclosure;
    a front panel connected to said housing to form a fifth side of the enclosure;
    a support bar operably mounted to the enclosure, having means for releasably supporting plants in an upright position, and forming an operable sixth side of the enclosure;
    said support bar operably mounted for movement between a first position wherein plants supported thereon project upwardly from an upper end of the enclosure, and a second position wherein plants supported thereon project within an interior of the enclosure.

2. A box for selectively displaying display items, comprising:
    a housing having a generally vertical back panel, a generally horizontal bottom panel affixed along a lower edge of the back panel, and a pair of opposing end panels connecting the back and bottom panels, said back, bottom and end panels forming four sides of an enclosure;
    a front panel connected to said housing to form a fifth side of the enclosure;
    a support bar operably mounted to the enclosure, having means for selectively supporting display items in an upright position thereon, said support bar forming an operable sixth side of the enclosure; and
    said support bar operably mounted for movement between a first position wherein display items supported on the support bar project upwardly from an upper end of the enclosure, and a second position wherein display items supported on project within an interior of the enclosure.

3. The box of claim 2, further comprising means for selectively retaining the support bar in the first and second positions.

4. The box of claim 2, wherein said support bar is pivotally mounted between said end panels for selective pivotal movement between the first and second positions.

5. The box of claim 4, wherein said means for releasably supporting display items includes said support bar having an elongated strut pivotally mounted between the end panels, and an elongated clamping arm adjustably secured to the strut for adjustment between a clamped position holding a display item between the arm and strut, and an unclamped position spaced from the strut.

6. The box of claim 2:
    wherein said front panel is pivotally connected along a lower edge to said bottom panel for pivotal movement between a closed position generally parallel to the back panel, and an open position generally perpendicular to the back panel; and
    wherein said support bar is pivotally mounted between said end panels for selective pivotal movement between the first and second positions.

7. The box of claim 6, further comprising means for selectively locking said front panel in the closed position.

* * * * *